United States Patent
Ariura et al.

(10) Patent No.: US 11,905,380 B2
(45) Date of Patent: Feb. 20, 2024

(54) METHOD FOR PRODUCING SHAPING MATERIAL

(71) Applicant: ZEON CORPORATION, Tokyo (JP)

(72) Inventors: Eito Ariura, Tokyo (JP); Satoshi Yamada, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 1196 days.

(21) Appl. No.: 16/493,504

(22) PCT Filed: Mar. 12, 2018

(86) PCT No.: PCT/JP2018/009541
§ 371 (c)(1),
(2) Date: Sep. 12, 2019

(87) PCT Pub. No.: WO2018/173838
PCT Pub. Date: Sep. 27, 2018

(65) Prior Publication Data
US 2020/0032003 A1 Jan. 30, 2020

(30) Foreign Application Priority Data
Mar. 21, 2017 (JP) .................. 2017-054947

(51) Int. Cl.
*C08J 3/00* (2006.01)
*B29B 7/00* (2006.01)
(Continued)

(52) U.S. Cl.
CPC .................. *C08J 3/005* (2013.01); *B29B 7/48* (2013.01); *B29B 7/84* (2013.01); *B29B 7/847* (2013.01);
(Continued)

(58) Field of Classification Search
CPC .... C08J 3/00; C08J 3/005; B29B 7/00; B29B 7/40; B29B 7/48; B29B 7/80; B29B 7/84;
(Continued)

(56) References Cited

FOREIGN PATENT DOCUMENTS

| JP | 2004189826 A | 7/2004 |
|----|--------------|--------|
| JP | 2008302627 A | 12/2008 |
| JP | 2015101101 A | 6/2015 |

OTHER PUBLICATIONS

May 29, 2018, International Search Report issued in the International Patent Application No. PCT/JP2018/009541.
(Continued)

*Primary Examiner* — Jacob T Minskey
*Assistant Examiner* — Matthew Hoover
(74) *Attorney, Agent, or Firm* — KENJA IP LAW PC

(57) ABSTRACT

Provided is a method for producing a shaping material that contains a cyclic olefin polymer and has a low content of a volatile impurity. This method for producing a shaping material is a method which includes passing a raw-material resin in a molten state through an extruder to produce a shaping material, and in which the extruder is equipped with a cylinder, a screw housed within the cylinder, a resin introduction port for introducing the raw-material resin into the cylinder, a resin discharge port for discharging the molten resin from the cylinder, a fluid injection port for injecting carbon dioxide or water into the cylinder between the resin introduction port and the resin discharge port, and a fluid discharge port for removing fluid in the cylinder by suction downstream of the fluid injection port and between the resin introduction port and the resin discharge port.

6 Claims, 1 Drawing Sheet

(51) Int. Cl.
- *B29B 11/00* (2006.01)
- *B29B 13/00* (2006.01)
- *C08F 232/00* (2006.01)
- *B29B 7/48* (2006.01)
- *C08F 232/08* (2006.01)
- *B29B 7/84* (2006.01)
- *B29B 11/10* (2006.01)
- *B29B 11/14* (2006.01)
- *B29B 13/04* (2006.01)

(52) U.S. Cl.
CPC .............. *B29B 11/10* (2013.01); *B29B 11/14* (2013.01); *B29B 13/04* (2013.01); *C08F 232/08* (2013.01); *C08J 2345/00* (2013.01)

(58) Field of Classification Search
CPC ......... B29B 7/847; B29B 11/00; B29B 11/10; B29B 11/14; B29B 13/00; B29B 13/04; C08F 232/00; C08F 232/08
See application file for complete search history.

(56) References Cited

OTHER PUBLICATIONS

Sep. 24, 2019, International Preliminary Report on Patentability issued in the International Patent Application No. PCT/JP2018/009541.

METHOD FOR PRODUCING SHAPING MATERIAL

TECHNICAL FIELD

The present disclosure relates to a method for producing a shaping material that contains a cyclic olefin polymer and has a low content of a volatile compound.

BACKGROUND

Alicyclic structure-containing polymers are widely used as shaping materials for various shaped resin products because they are excellent in chemical resistance, water vapor barrier property, heat resistance, transparency, and the like.

For example, PTL 1 describes a method for producing a shaping material containing an alicyclic structure-containing polymer, comprising a purification step using an extruder.

PTL 1 also describes that the shaping material obtained by the production method is suitable as a shaping material for, for example, a storage container of a semiconductor material because it has a low content of a volatile compound.

CITATION LIST

Patent Literature

PTL 1: JP2004-189826A

SUMMARY

Technical Problem

Using the method described in PTL 1, it is possible to efficiently obtain a shaping material containing an alicyclic structure-containing polymer and containing several ppm of a volatile compound.

However, according to the study of the present inventors, it has been found that in a case in which the alicyclic structure-containing polymer is a polymer having an alicyclic structure in the main chain such as a cyclic olefin polymer, the mechanical strength of the shaped resin product finally obtained tends to decrease when the method described in PTL 1 is used to carry out a purification treatment.

Therefore, there has been a demand for a method capable of efficiently producing a shaping material which contains a cyclic olefin polymer and has a low content of a volatile impurity, and from which a shaped resin product having a sufficient mechanical strength can be obtained.

The present disclosure has been made in view of the situation set forth above, and an object thereof is to provide a method capable of efficiently producing a shaping material which contains a cyclic olefin polymer and has a low content of a volatile impurity, and from which a shaped resin product having a sufficient mechanical strength can be obtained.

Solution to Problem

The present inventors conducted intensive studies about a method for producing a shaping material containing a cyclic olefin polymer in order to solve the problem set forth above. As a result, the inventors discovered that by appropriately controlling the rotation number of a screw and the oxygen concentration of the gas phase within a cylinder during a purification treatment in which a molten resin is brought into contact with carbon dioxide or water while being transported within the cylinder, it is possible to produce a shaping material which contains a cyclic olefin polymer and has a low content of a volatile impurity, and from which a shaped resin product having a sufficient mechanical strength can be obtained. In this manner, the inventors completed the present disclosure.

Thus, according to the present disclosure, there are provided methods for producing a shaping material of the following [1] to [6].

[1] A method for producing a shaping material by passing a raw-material resin that contains a cyclic olefin polymer in a molten state through an extruder, the extruder being equipped with a cylinder, a screw housed within the cylinder, a resin introduction port for introducing the raw-material resin into the cylinder, a resin discharge port for discharging the molten resin from the cylinder, a fluid injection port for injecting carbon dioxide or water into the cylinder between the resin introduction port and the resin discharge port, and a fluid discharge port for removing fluid in the cylinder by suction downstream of the fluid injection port and between the resin introduction port and the resin discharge port;

the method comprising: injecting 1 to 6 parts by mass of carbon dioxide or water per 100 parts by mass of the raw-material resin into the cylinder from the fluid injection port while transporting the molten raw-material resin within the cylinder to bring carbon dioxide or water into contact with the molten raw-material resin, and discharging fluid in the cylinder from the fluid discharge port, thereby removing a volatile compound in the raw-material resin; and cooling and solidifying the molten resin discharged from the resin discharge port, wherein the rotation number of the screw during extrusion of the molten raw-material resin is 150 rpm or higher; and the oxygen concentration of the gas phase within the cylinder is 5% by volume or less.

[2] The method for producing a shaping material according to [1], wherein the content ratio of a compound that has a boiling point of lower than 200° C. with respect to the whole raw-material resin is 15 to 50 ppm in terms of n-decane when the components of the raw-material resin are analyzed by the following dynamic headspace-gas chromatography/mass spectrometry (1) [DHS-GC/MS (1)].

[DHS-GC/MS (1)]

A sample container composed of a glass tube having an inner diameter of 4 mm, in which 100 mg of the raw-material resin was charged, was connected to a gas collection tube that had been cooled by liquid nitrogen, and then the sample container was heated at 200° C. for 30 minutes in a high-purity helium stream, followed by continuously collecting gas released from the raw-material resin into the gas collection tube. The collected gas was subjected to thermal desorption-gas chromatography-mass spectrometry using n-decane as an internal standard, and the amount of the gas released from the raw-material resin was calculated in terms of n-decane.

[3] The method for producing a shaping material according to [1] or [2], wherein the extruder is a twin-screw extruder.

[4] The method for producing a shaping material according to any one of [1] to [3], wherein the temperature of the molten raw-material resin in the cylinder is 290° C. to 330° C.

[5] The method for producing a shaping material according to any one of [1] to [4], wherein the pressure at the fluid discharge port is 500 to 3,000 kPa.

[6] The method for producing a shaping material according to any one of [1] to [5], wherein the content ratio of a compound that has a boiling point of lower than 200° C. with respect to the whole shaping material is 3 ppm or less in terms of n-decane when the components of the shaping material are analyzed by the following dynamic headspace-gas chromatography/mass spectrometry (2) [DHS-GC/MS (2)].

[DHS-GC/MS (2)]

A sample container composed of a glass tube having an inner diameter of 4 mm, in which 100 mg of the shaping material was charged, was connected to a gas collection tube that had been cooled by liquid nitrogen, and then the sample container was heated at 200° C. for 30 minutes in a high-purity helium stream, followed by continuously collecting gas released from the shaping material into the gas collection tube. The collected gas was subjected to thermal desorption-gas chromatography-mass spectrometry using n-decane as an internal standard, and the amount of the gas released from the shaping material was calculated in terms of n-decane.

Advantageous Effect

According to the present disclosure, there is provided a method capable of efficiently producing a shaping material which contains a cyclic olefin polymer and has a low content of a volatile impurity, and from which a shaped resin product having a sufficient mechanical strength can be obtained.

DETAILED DESCRIPTION

Figure 1:
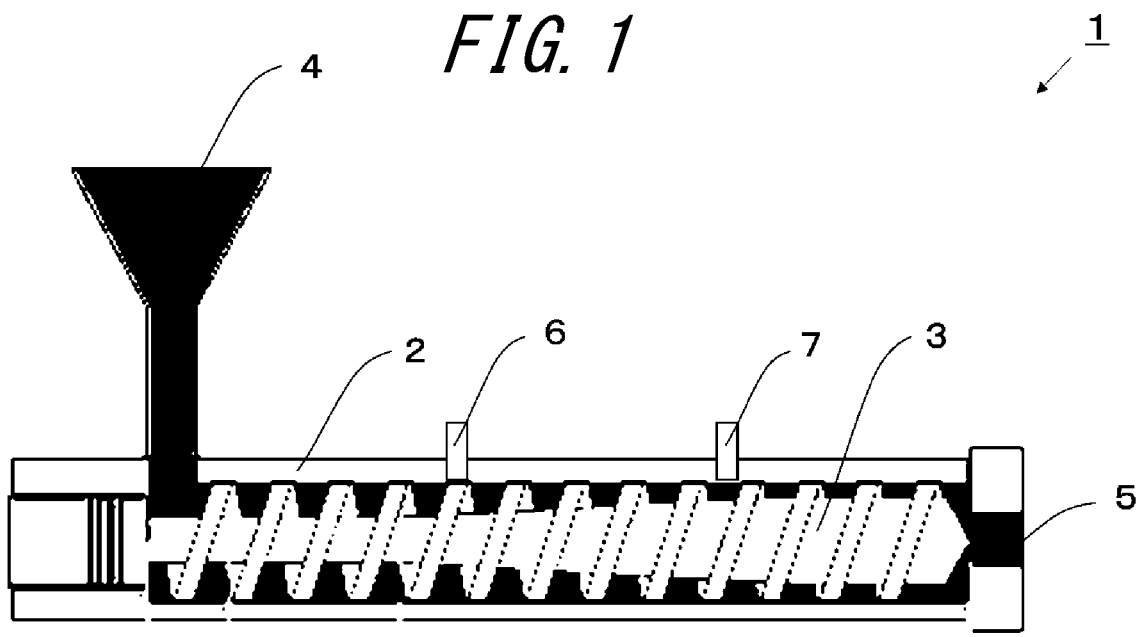
FIG. 1 is a schematic view of a cross section of an extruder that can be used in a method for producing a shaping material of the present disclosure.

The presently disclosed method for producing a shaping material is a method for producing a shaping material by passing a raw-material resin that contains a cyclic olefin polymer in a molten state through an extruder, the extruder being equipped with a cylinder, a screw housed within the cylinder, a resin introduction port for introducing the raw-material resin into the cylinder, a resin discharge port for discharging the molten resin from the cylinder, a fluid injection port for injecting carbon dioxide or water into the cylinder between the resin introduction port and the resin discharge port, and a fluid discharge port for removing fluid in the cylinder by suction downstream of the fluid injection port and between the resin introduction port and the resin discharge port, the method comprising: injecting 1 to 6 parts by mass of carbon dioxide or water per 100 parts by mass of the raw-material resin into the cylinder from the fluid injection port while transporting the molten raw-material resin within the cylinder to bring carbon dioxide or water into contact with the molten raw-material resin, and discharging fluid in the cylinder from the fluid discharge port, thereby removing a volatile compound in the raw-material resin; and cooling and solidifying the molten resin discharged from the resin discharge port, wherein the rotation number of the screw during extrusion of the molten raw-material resin is 150 rpm or higher; and the oxygen concentration of the gas phase within the cylinder is 5% by volume or less.

[Raw-Material Resin]

The raw-material resin used in the presently disclosed method for producing a shaping material contains a cyclic olefin polymer.

The cyclic olefin polymer is a polymer obtainable by polymerizing a cyclic olefin monomer or a hydride thereof, having an alicyclic structure in the main chain.

Examples of the alicyclic structure contained in the cyclic olefin polymer include a cycloalkane structure and a cycloalkene structure. Among these, the cycloalkane structure is preferable because a shaped resin product excellent in transparency, light resistance, durability, and the like is easily obtainable. The number of carbon atoms constituting the alicyclic structure is not particularly limited, but is usually 4 to 30, preferably 5 to 20, and more preferably 5 to 15.

Examples of the cyclic olefin polymer used herein include a ring-opened polymer of a cyclic olefin monomer (hereinafter, also referred to as "polymer (α)") and a hydride thereof, and an addition polymer in which a cyclic olefin monomer is used (hereinafter, also referred to as "polymer on (β)") and a hydride thereof.

As the cyclic olefin polymer, the hydride of polymer (α) is preferable because it is excellent in various properties in a well-balanced manner.

(1) Polymer (α) and Hydride Thereof

The cyclic olefin monomer used to produce the polymer (α) and the hydride thereof is a compound having a ring structure composed of carbon atoms and having a carbon-carbon double bond in the ring. Examples of the cyclic olefin monomer include a norbornene-based monomer. In addition, when the polymer (α) is a copolymer, a cyclic olefin consisting of a single ring can also be used as the cyclic olefin monomer. The content ratio of the norbornene-based monomer in the cyclic olefin monomers is not particularly limited, but is preferably more than 90% by mass, and more preferably more than 95% by mass.

The norbornene-based monomer is a monomer having a norbornene ring.

Examples of the norbornene-based monomer include bicyclic monomers such as bicyclo[2.2.1]hept-2-ene (common name: norbornene), 5-ethylidene-bicyclo[2.2.1]hept-2-ene (common name: ethylidene norbornene), and derivatives thereof (having a substituent in a ring); tricyclic monomers such as tricyclo[5.2.1.0$^{2,6}$]dec-3,8-diene (common name: dicyclopentadiene) and derivatives thereof; and tetracyclic monomers such as tetracyclo[7.4.0.0$^{2,7}$.1$^{10,13}$]tetradec-2,4,6,11-tetraen (common name: methanotetrahydrofluorene) and derivatives thereof, tetracyclo[6.2.1.1$^{3,6}$.0$^{2,7}$]dodeca-4-ene (common name: tetracyclododecene), and 9-ethylidenetetracyclo[6.2.1.1$^{3,6}$.0$^{2,7}$]dodec-4-ene and derivatives thereof.

Each of these monomers may have a substituent at any position. Examples of the substituent include alkyl groups such as methyl and ethyl; alkenyl groups such as vinyl; alkylidene groups such as ethylidene and propan-2-ylidene; aryl groups such as phenyl; hydroxy group; acid anhydride groups; carboxyl group; and alkoxycarbonyl groups such as methoxycarbonyl.

Examples of the cyclic olefin consisting of a single ring include cyclic monoolefins such as cyclobutene, cyclopentene, methylcyclopentene, cyclohexene, methylcyclohexene, cycloheptene, and cyclooctene; and cyclic diolefins such as cyclohexadiene, methylcyclohexadiene, cyclooctadiene, methylcyclooctadiene, and phenylcyclooctadiene.

One of these cyclic olefin monomers may be used individually, or two or more of these cyclic olefin monomers may be used in combination.

When two or more of these cyclic olefin monomers are used, the polymer (α) may be a block copolymer or a random copolymer.

The polymer (α) may be a crystalline polymer or an amorphous polymer. In addition, the stereoregularity of the polymer (α) is not particularly limited.

The polymer (α) can be produced according to a known method using a metathesis polymerization catalyst.

The metathesis polymerization catalyst is not particularly limited and any known catalyst may be used. Examples of the metathesis polymerization catalyst include a catalyst system comprising a halide, a nitrate, or an acetylacetone compound of a metal selected from ruthenium, rhodium, palladium, osmium, iridium, platinum, or the like, and a reductant; a catalyst system comprising a halide or an acetylacetone compound of a metal selected from titanium, vanadium, zirconium, tungsten, or molybdenum and an organoaluminum compound as a cocatalyst; and a Schlock-type or Grubbs-type living ring-opening metathesis polymerization catalyst (Japanese Patent Application Laid-Open No. H7-179575, J. Am. Chem. Soc., 1986, 108, p. 733, J. Am. Chem. Soc., 1993, 115, p. 9858, and J. Am. Chem. Soc., 1996, 118, p. 100).

One of these metathesis polymerization catalysts may be used individually, or two or more of these metathesis polymerization catalysts may be used in combination.

The used amount of the metathesis polymerization catalyst may be appropriately selected according to the polymerization condition or the like, but is usually 0.000001 to 0.1 mol, preferably 0.00001 to 0.01 mol per mol of the cyclic olefin monomer.

When ring-opening polymerization of the cyclic olefin monomer is performed, a linear α-olefin having a carbon number of 4 to 40 such as 1-butene, 1-hexene, or 1-decene can be used as a molecular weight modifier. The addition amount of the linear α-olefin may be an amount sufficient to obtain a copolymer having a desired molecular weight. The molar ratio of (molecular weight modifier):(norbornene-based monomer) is usually 1:50 to 1:1,000,000, preferably 1:100 to 1:5,000, and more preferably 1:300 to 1:3,000.

The ring-opening polymerization of the cyclic olefin monomer can be carried out in an organic solvent. No specific limitations are placed on the organic solvent so long as it is inert to the polymerization reaction. Examples of the organic solvent include aromatic hydrocarbon solvents such as benzene, toluene, and xylene; aliphatic hydrocarbon solvents such as n-pentane, n-hexane, and n-heptane; alicyclic hydrocarbon solvents such as cyclohexane, methylcyclohexane, decalin, and bicyclononane; halogenated hydrocarbon solvents such as dichloroethane, chlorobenzene, dichlorobenzene, and trichlorobenzene; and mixed solvents of two or more thereof.

The polymerization temperature is not particularly limited, but is usually −50° C. to 250° C., preferably −30° C. to 200° C., more preferably −20° C. to 150° C., and particularly preferably 35° C. to 75° C. The polymerization time is appropriately selected according to the polymerization condition, but is usually 30 minutes to 20 hours, preferably 1 hour to 10 hours, and more preferably 3 to 7 hours.

A hydride of the polymer (α) can be obtained by subjecting the polymer (α) obtained by the above method to a hydrogenation reaction.

The hydrogenation reaction of the polymer (α) can be carried out by contacting the polymer (α) with hydrogen in the presence of a hydrogenation catalyst according to a routine procedure.

The hydrogenation catalyst may be a homogeneous catalyst or a heterogeneous catalyst, but the heterogeneous catalyst is preferred for the following reasons.

First, the heterogeneous catalyst can hydrogenate the polymer (α) in a short time because it exhibits especially superior activity under high temperature and high pressure.

Further, in the case of using the heterogeneous catalyst, it is possible to efficiently remove the catalyst residue by filtration when a hydride of the polymer (α) is dissolved in a solvent after the hydrogenation reaction.

Examples of the homogeneous catalyst include catalysts comprising a combination of a transition metal compound and an organoaluminum compound such as cobalt acetate/triethylaluminum, and nickel acetylacetonato/triisobutylaluminum; catalysts comprising a combination of a transition metal compound and an organic alkali metal compound such as titanocene dichloride/n-butyllithium, and zirconocene dichloride/sec-butyllithium; catalysts comprising a combination of a transition metal compound and an organomagnesium compound such as tetrabutoxytitanate/dimethylmagnesium; and precious metal complex catalysts such as dichlorobis(triphenylphosphine)palladium, chlorohydridocarbonyltris(triphenylphosphine)ruthenium, chlorohydridocarbonylbis(tricyclohexylphosphine)ruthenium, bis(tricyclohexylphosphine)benzylidine ruthenium (IV) dichloride, and chlorotris(triphenylphosphine)rhodium.

Examples of the heterogeneous catalyst include those having a metal such as Ni, Pd, Pt, Ru, Rh or the like on a support. In particular, it is preferable to use an adsorbent such as alumina or diatomite as the support when the amount of impurities in the resulting hydride is to be reduced.

The hydrogenation reaction is usually carried out in an organic solvent. No specific limitations are placed on the organic solvent so long as it is inert to the hydrogenation reaction. As the organic solvent, a hydrocarbon solvent is usually used because it easily dissolves the resulting hydride. Examples of the hydrocarbon solvent include aromatic hydrocarbon solvents such as benzene, toluene, and xylene; aliphatic hydrocarbon solvents such as n-pentane, n-hexane, and n-heptane; and alicyclic hydrocarbon solvents such as cyclohexane, methylcyclohexane, decalin, and bicyclononane.

One of these organic solvents may be used individually, or two or more of these organic solvents may be used in combination. In addition, the solvent used in the ring-opening polymerization reaction can usually be served for the hydrogenation reaction after the addition of a hydrogenation catalyst to the ring-opening polymerization reaction solution because it is also suitable as the solvent for the hydrogenation reaction.

The percent hydrogenation changes depending on the type of the hydrogenation catalyst or the reaction temperature. Therefore, when the polymer (α) has an aromatic ring, the residual ratio of the aromatic ring can be controlled by the selection of the hydrogenation catalyst, the adjustment of the reaction temperature, or the like. For example, in order to allow more than a certain number of the unsaturated bond of the aromatic ring to remain, control such as lowering the reaction temperature, lowering the hydrogen pressure, shortening the reaction time, or the like may be performed.

After completion of the hydrogenation reaction, the catalyst residue can be removed by a treatment such as centrifugation or filtration. In addition, if necessary, a catalyst deactivating agent such as water or an alcohol may be used, or an adsorbent such as activated clay or alumina may be added.

(2) Polymer (β) and Hydride Thereof

Examples of the cyclic olefin monomer used for the synthesis of the polymer (β) and the hydride thereof include the same as those exemplified as the cyclic olefin monomer used for the synthesis of the polymer (α).

In the synthesis of the polymer (β), other monomer copolymerizable with the cyclic olefin monomer can also be used as the monomer together with the cyclic olefin monomer.

Examples of the other monomer include α-olefins having a carbon number of 2 to 20 such as ethylene, propylene, 1-butene, 1-pentene, and 1-hexene; aromatic ring vinyl compounds such as styrene and α-methylstyrene; and non-conjugated dienes such as 1,4-hexadiene, 4-methyl-1,4-hexadiene, 5-methyl-1,4-hexadiene, and 1,7-octadiene. Among these, α-olefins are preferable, and ethylene is more preferable.

One of these other monomers may be used individually, or two or more of these other monomers may be used in combination.

In the case of addition copolymerization of a cyclic olefin monomer and other monomer, the mass ratio of the used amount of the cyclic olefin monomer to that of the other monomer (cyclic olefin monomer:other monomer) is usually 30:70 to 99:1, preferably 50:50 to 97:3, and more preferably 70:30 to 95:5.

In the case of using two or more kinds of cyclic olefin monomers, and in the case of using a cyclic olefin monomer and other monomer, the polymer (β) may be a block copolymer or a random copolymer.

The polymer (β) can be synthesized according to a known method using an addition polymerization catalyst.

Examples of the addition polymerization catalyst include a vanadium-based catalyst comprising a vanadium compound and an organoaluminum compound, a titanium-based catalyst comprising a titanium compound and an organoaluminum compound, and a zirconium-based catalyst comprising a zirconium complex and an aluminoxane.

One of these addition polymerization catalysts may be used individually, or two or more of these addition polymerization catalysts may be used in combination. The used amount of the addition polymerization catalyst may be appropriately selected according to the polymerization condition or the like, but is usually 0.000001 to 0.1 mol, preferably 0.00001 to 0.01 mol per mol of the monomer.

The addition polymerization of the cyclic olefin monomer is usually carried out in an organic solvent. Examples of the organic solvent include the same as those exemplified as the solvent used for the ring-opening polymerization of the cyclic olefin monomer.

The polymerization temperature is usually −50° C. to 250° C., preferably −30° C. to 200° C., more preferably −20° C. to 150° C., and particularly preferably 35° C. to 75° C. The polymerization time is appropriately selected according to the polymerization condition, but is usually 30 minutes to 20 hours, preferably 1 hour to 10 hours, and more preferably 3 to 7 hours.

A hydride of the polymer (β) can be obtained by subjecting the polymer (β) obtained by the above method to a hydrogenation reaction.

The hydrogenation reaction of the polymer (β) can be performed by the same method as that described above for hydrogenating the polymer (α).

The weight-average molecular weight (Mw) of the cyclic olefin polymer used herein is preferably 20,000 to 100,000, more preferably 25,000 to 80,000, and particularly preferably 27,000 to 32,000. When the weight-average molecular weight (Mw) of the cyclic olefin polymer is too small, there is a risk that the strength of the shaped resin product is deteriorated. Conversely, when the weight-average molecular weight (Mw) of the cyclic olefin polymer is too large, there is a risk that the formability of the resin composition is deteriorated.

The molecular weight distribution (Mw/Mn) of the cyclic olefin polymer is not particularly limited, but is preferably 1 to 5, more preferably 1 to 4, and particularly preferably 2 to 3.

When the molecular weight distribution of the cyclic olefin polymer is within the above range, a shaped resin product having a sufficient mechanical strength can be obtained.

The weight-average molecular weight (Mw) and the number-average molecular weight (Mn) of the cyclic olefin polymer are values in terms of polystyrene measured by gel permeation chromatography (GPC) using tetrahydrofuran as a developing solvent.

The raw-material resin used in the presently disclosed method for producing a shaping material may contain a component other than the cyclic olefin polymer.

Examples of the component other than the cyclic olefin polymer include additives such as antioxidants, ultraviolet absorbers, light stabilizers, near-infrared absorbers, colorants including dyes and pigments, plasticizers, antistatic agents, fluorescent brightening agents, and other resins. Among these, as the additive, the antioxidant is preferable.

Examples of the antioxidant include phenolic antioxidants, phosphoric antioxidants, and sulfur-based antioxidants.

Examples of the phenolic antioxidant include 3,5-di-t-butyl-4-hydroxytoluene, 2,2'-methylenebis(6-t-butyl-4-methylphenol), 4,4'-butylidenebis(6-t-butyl-3-methylphenol), 4,4'-thiobis(6-t-butyl-3-methylphenol), α-tocopherol, 2,2,4-trimethyl-6-hydroxy-7-t-butylchroman, tetrakis[methylene-3-(3',5'-di-t-butyl-4'-hydroxyphenyl)propionate]methane, and pentaerythritol-tetrakis[3-(3,5-di-t-butyl-4-hydroxyphenyl)propionate.

Examples of the phosphoric antioxidant include distearyl pentaerythritol diphosphite, bis(2,4-di-t-butylphenyl)pentaerythritol diphosphite, tris(2,4-di-t-butylphenyl)phosphite, tetrakis(2,4-di-t-butylphenyl)4,4'-biphenyldiphosphite, and trinonylphenyl phosphite.

Examples of the phosphoric antioxidant include distearyl pentaerythritol diphosphite, bis(2,4-di-t-butylphenyl)pentaerythritol diphosphite, tris(2,4-di-t-butylphenyl)phosphite, tetrakis(2,4-di-t-butylphenyl)4,4'-biphenyldiphosphite, and trinonylphenyl phosphite.

Examples of the sulfur-based antioxidant include distearyl thiodipropionate and dilauryl thiodipropionate.

The content of the additive can be appropriately determined according to the purpose. The content of the additive is usually 60% by mass or less, preferably 0.01 to 60% by mass, more preferably 0.02 to 50% by mass with respect to the whole raw-material resin.

Note that the content of the additive can be appropriately determined according to the type of the additive or the purpose of addition. For example, when the additive is an antioxidant, the content of the additive is usually 0.01 to 10% by mass, preferably 0.02 to 5% by mass with respect to the whole raw-material resin.

The method for producing a raw-material resin is not particularly limited. For example, the solid content obtained by purifying the reaction solution after completion of the polymerization reaction or hydrogenation reaction can be used as the raw-material resin.

In addition, it is also possible that this solid content is optionally mixed and melt-kneaded with an additive, the resulting molten resin is extruded in the form of a strand, which strand is cooled followed by cutting into a predetermined size, and the resultant is used as a raw-material resin.

When the components of the raw-material resin are analyzed by the following dynamic headspace-gas chromatography/mass spectrometry (1) [DHS-GC/MS (1)], "the content ratio of a compound that has a boiling point of lower than 150° C. with respect to the whole raw-material resin" and "the content ratio of a compound that has a boiling point of from 150° C. to 200° C. with respect to the whole raw-material resin" are preferably 7.5 to 25 ppm, and more preferably 7.5 to 15 ppm in terms of n-decane, respectively.

[DHS-GC/MS (1)]

A sample container composed of a glass tube having an inner diameter of 4 mm, in which 100 mg of the raw-material resin is charged, is connected to a gas collection tube that has been cooled by liquid nitrogen, and then the sample container is heated at 200° C. for 30 minutes in a high-purity helium stream, followed by continuously collecting gas released from the raw-material resin into the gas collection tube. The collected gas is subjected to thermal desorption-gas chromatography-mass spectrometry using n-decane as an internal standard, and the amount of the gas released from the raw-material resin is calculated in terms of n-decane.

When the content ratio of a compound that has a boiling point of lower than 200° C. is 50 ppm or less in terms of n-decane, it becomes easy to obtain a shaping material in which the content ratio of a compound that has a boiling point of lower than 200° C. with respect to the whole shaping material is 3 ppm or less in terms of n-decane according to analysis by DHS-GC/MS (2) described later.

[Extruder]

The extruder used in the presently disclosed method for producing a shaping material is equipped with a cylinder, a screw housed within the cylinder, a resin introduction port for introducing the raw-material resin into the cylinder, a resin discharge port for discharging the molten resin from the cylinder, a fluid injection port for injecting carbon dioxide or water into the cylinder between the resin introduction port and the resin discharge port, and a fluid discharge port for removing fluid in the cylinder by suction downstream of the fluid injection port and between the resin introduction port and the resin discharge port.

FIG. 1 is a schematic view of a cross section of an extruder that can be used in a method for producing a shaping material of the present disclosure.

An extruder (1) depicted in FIG. 1 is equipped with a cylinder (2), a screw (3), a resin introduction port (4), a resin discharge port (5), a fluid injection port (6), and a fluid discharge port (7).

The number of the fluid injection ports and the number of the fluid discharge ports are not limited. For example, the extruder may have one fluid injection port and one fluid discharge port as depicted in FIG. 1, or may have two or more fluid injection ports or fluid discharge ports. Note that when two or more fluid injection ports or fluid discharge ports are provided, "equipped with a fluid discharge port for removing fluid in the cylinder by suction downstream of the fluid injection port" means that among fluid injection ports and fluid discharge ports, the one located most downstream is a fluid discharge port.

The presently disclosed method for producing a shaping material can be efficiently performed, for example, using an extruder with a cylinder comprising a plurality of cylinder units which are joined with each other.

Figure 2A:
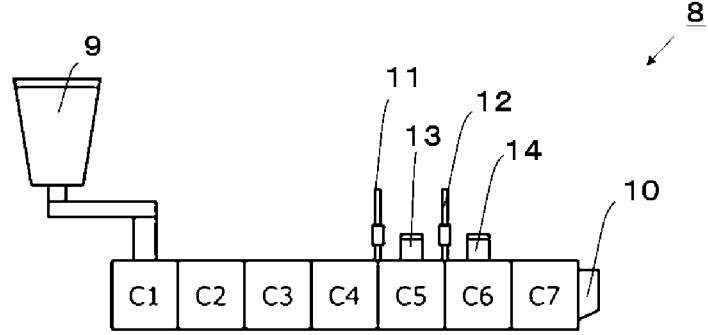
FIG. 2A is a schematic view (Part 1) of an extruder with a cylinder comprising a plurality of cylinder units which are joined with each other.

For example, an extruder (8) depicted in FIG. 2A is equipped with a cylinder comprising cylinder units C1 to C7 which are joined with each other, and further equipped with a resin introduction port (9), a resin discharge port (10), a fluid injection port (11) and (12), and a fluid discharge port (13) and (14).

Figure 2B:
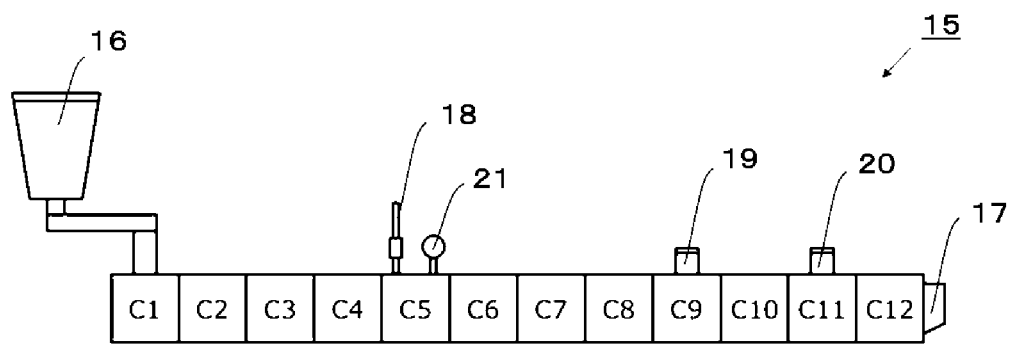
FIG. 2B is a schematic view (Part 2) of an extruder with a cylinder comprising a plurality of cylinder units which are joined with each other.

On the other hand, an extruder (15) depicted in FIG. 2B is equipped with a cylinder comprising cylinder units C1 to C12 which are joined with each other, and further equipped with a resin introduction port (16), a resin discharge port (17), a fluid injection port (18), and a fluid discharge port (19) and (20). The extruder (15) also has a pressure gauge (21), which can measure the pressure in the cylinder.

In these extruders, the number of the cylinder units can be appropriately determined according to the purpose.

The extruder used herein is preferably a twin-screw extruder, and more preferably a completely meshed co-rotating twin-screw extruder. The twin-screw extruder is superior to a single-screw extruder in the kneading effect. Further, the completely meshed co-rotating twin-screw extruder is especially superior in the kneading effect, the degassing effect, and the self-cleaning property.

When the inside of the cylinder is pressurized, it is preferable to use an extruder excellent in pressure resistance and further provide a pressure gauge as in the above-mentioned extruder (15). Using such an extruder, the fluid injected into the cylinder can be brought into a supercritical state.

[Method for Producing Shaping Material]

The presently disclosed method for producing a shaping material comprises: a step of injecting 1 to 6 parts by mass of carbon dioxide or water per 100 parts by mass of the raw-material resin into the cylinder from the fluid injection port while transporting the molten raw-material resin within the cylinder to bring carbon dioxide or water into contact with the molten raw-material resin, and discharging fluid in the cylinder from the fluid discharge port, thereby removing a volatile compound in the raw-material resin (step 1); and a step of cooling and solidifying the molten resin discharged from the resin discharge port (step 2).

In step 1, a volatile compound in the raw-material resin is removed by injecting 1 to 6 parts by mass of carbon dioxide or water per 100 parts by mass of the raw-material resin into the cylinder from the fluid injection port while transporting the molten raw-material resin within the cylinder to bring carbon dioxide or water into contact with the molten raw-material resin, and discharging fluid in the cylinder from the fluid discharge port.

The temperature of the molten raw-material resin in the cylinder is preferably 290° C. to 330° C., more preferably 300° C. to 330° C., and still more preferably 310° C. to 330° C.

When the temperature of the molten raw-material resin is 290° C. or higher, the volatile compound can be removed more efficiently. Further, when the temperature of the molten raw-material resin is 300° C. or lower, thermal decomposition of the resin is suppressed and it becomes easy to obtain a shaping material from which a shaped resin product having a sufficient mechanical strength can be obtained.

The inside pressure of the cylinder is preferably 5.0 to 15.0 MPa (G). The pressure is preferably 5.0 to 10.0 MPa (G). When the inside pressure of the cylinder is within this range, the volatile compound can be removed more efficiently.

The rotation number of the screw during extrusion of the molten raw-material resin is 150 rpm or higher, preferably 150 to 500 rpm, more preferably 300 to 500 rpm, and particularly preferably 300 to 350 rpm.

When the rotation number of the screw is less than 150 rpm, it is difficult to sufficiently remove the volatile compound.

The oxygen concentration of the gas phase within the cylinder is 5% by volume or less, and preferably 4% by volume or less. Although the oxygen concentration does not have a particular lower limit and is preferably as small as possible, the oxygen concentration is usually 0.1% by volume or more.

As described above, when the method described in JP2004-189826A is used to carry out a purification treatment of a raw-material resin containing a cyclic olefin polymer, the mechanical strength of the shaped resin product finally obtained tends to decrease. It is possible to resolve this problem by reducing the oxygen concentration of the gas phase within the cylinder to prevent burning of the raw-material resin.

No specific limitations are placed on a method for reducing the oxygen concentration of the gas phase within the cylinder to 5% by volume or less. Examples of the method include a method in which inert gas is introduced together when the raw-material resin is introduced into the cylinder from the resin introduction port.

The amount of carbon dioxide or water injected into the cylinder is 1 to 6 parts by mass, preferably 1 to 5 parts by mass, more preferably 2 to 4 parts by mass, particularly preferably 3 to 4 parts by mass per 100 parts by mass of the raw-material resin. In case of using an extruder with two or more fluid injection ports, this amount of carbon dioxide or water means the total amount injected into the cylinder.

When the amount of carbon dioxide or water injected into the cylinder is within this range, the volatile compound can be removed more efficiently. When the injected amount of the solvent is more than 6 parts by mass, there is a risk that the temperature of the molten resin is lowered too much.

In the case of using an extruder with two or more fluid injection ports, it is preferable to use two or more fluid injection ports rather than only one fluid injection port for injecting fluid, if the total injected amount of fluid is the same in either way. When a plurality of fluid injection ports is used, the volatile compound can be removed more efficiently.

Carbon dioxide is usually introduced into the cylinder in a gaseous state. In the cylinder, carbon dioxide usually exists in a gaseous or supercritical state.

Water is usually introduced into the cylinder in a liquid or gaseous state. In the cylinder, water usually exists in a gaseous state.

Carbon dioxide or water introduced into the cylinder usually becomes bubbles and disperses in the molten raw-material resin. The volatile compound such as a solvent molecule or an unreacted monomer used in the polymerization reaction is removed from the fluid discharge port together with carbon dioxide or water after being taken into the bubbles.

The pressure at the fluid discharge port is preferably 500 to 3,000 Pa, and more preferably 500 to 1,000 Pa. When the pressure at the fluid discharge port is within this range, the volatile compound can be removed more efficiently.

In step 2, the molten resin discharged from the resin discharge port is cooled and solidified.

The step 2 can be performed according to a routine procedure.

For example, the molten resin is extruded in the form of a rod, which rod is cooled and solidified followed by cutting into an appropriate length using a strand cutter, thereby attaining pelletizing.

The shaping material obtainable by the disclosed method has a low content of a volatile compound.

The content ratio of a compound that has a boiling point of lower than 200° C. with respect to the whole shaping material is preferably 3 ppm by mass or less, more preferably 2 ppm by mass or less in terms of n-decane when the components of the shaping material are analyzed by the following dynamic headspace-gas chromatography/mass spectrometry (2) [DHS-GC/MS (2)]. Although the content ratio does not have a particular lower limit and is preferably as small as possible, the content ratio is usually 0.5 ppm by mass or more.

In addition, "the content ratio of a compound that has a boiling point of lower than 150° C. with respect to the whole shaping material" is preferably 0.5 ppm by mass or less in terms of n-decane, and "the content ratio of a compound that has a boiling point of 150° C. or higher and lower than 200° C. with respect to the whole shaping material" is preferably 2.5 ppm by mass or less in terms of n-decane.

[DHS-GC/MS (2)]

A sample container composed of a glass tube having an inner diameter of 4 mm, in which 100 mg of the shaping material is charged, is connected to a gas collection tube that has been cooled by liquid nitrogen, and then the sample container is heated at 200° C. for 30 minutes in a high-purity helium stream, followed by continuously collecting gas released from the shaping material into the gas collection tube. The collected gas is subjected to thermal desorption-gas chromatography-mass spectrometry using n-decane as an internal standard, and the amount of the gas released from the shaping material is calculated in terms of n-decane.

Thus, the shaping material of the present disclosure has an extremely low content of a volatile compound, and the shaped resin product obtained using the shaping material of the present disclosure has a sufficient mechanical strength.

The shaping material of the present disclosure is suitably used as a shaping material for a shaped resin product such as a resin container used in a semiconductor production process due to such properties.

EXAMPLES

The following provides a more detailed description of the present disclosure through examples and comparative examples. Note that the present disclosure is not limited to these examples. Hereinafter, "part" and "parts" are based on mass unless otherwise specified.

The measurements of various physical properties were performed according to the following methods.

(1) Molecular Weight (Weight-Average Molecular Weight and Number-Average Molecular Weight) of Cyclic Olefin Polymer The molecular weight of the cyclic olefin polymer was measured by a gel permeation chromatography (GPC) system HLC-8320 (Tosoh Corporation) with an H-type column (Tosoh Corporation) at 40° C. using tetrahydrofuran as a solvent and determined in terms of polystyrene.

(2) Percent Hydrogenation in Hydrogenation Reaction $^1$H-NMR measurement was carried out using an ortho-dichlorobenzene-d4 solvent to determine the percent hydrogenation in the hydrogenation reaction.

(3) Glass-Transition Temperature of Cyclic Olefin Polymer

The sample that had heated to 320° C. in a nitrogen atmosphere was rapidly cooled with liquid nitrogen and heated at 10° C./min using a differential scanning calorimeter (DSC) to determine the glass-transition temperature of the cyclic olefin polymer.

(4) Amount of Volatile Components in Raw-Material Resin or Shaping Material

A sample container composed of a glass tube having an inner diameter of 4 mm, in which 100 mg of a sample was charged, was connected to a gas collection tube that had been cooled by liquid nitrogen, and then the sample container was heated at 200° C. for 30 minutes in a high-purity helium (helium purity: 99.99995% by volume or more) stream, followed by continuously collecting gas released from the sample into the gas collection tube. The collected gas was subjected to thermal desorption-gas chromatography-mass spectrometry using n-decane as an internal standard, and the amount of the gas released from the sample was calculated in terms of n-decane.

The following instruments and analysis conditions were used in this analysis.

[Thermal Desorption]
Instrument: TDS A2 from Gerstel
Sample Heating Condition: 200° C. for 30 min
Helium Gas Flow Rate: 30 ml/min
Gas Collection Tube: a tube having a diameter of 1 mm and filled with glass wool
Temperature of Gas Collection Tube: −130° C. (at the time of gas collection), 280° C. (at the time of gas release)
[Gas Chromatography]
Instrument: 6890N from Agilent Technologies Japan, Ltd.
Column: HP-5 ms from Agilent Technologies Japan, Ltd. (0.25×30 m, df=0.25 µm)
Carrier Gas Flow Rate: 1 ml/min
Column Pressure: NONE (Flow control)
Heating Profile: 40° C. for 3 min elevated at 10° C./min 280° C. for 10 min
[Mass Spectrometer]
Instrument: 5973N from Agilent Technologies Japan, Ltd.

Note that outgas A in Table 1 consists of compounds having a boiling point of lower than 150° C. (mainly a solvent used in the synthesis), and outgas B consists of compounds having a boiling point of 150° C. to 200° C. (mainly residual monomers).

(5) Measurement of Mechanical Strength

Injection molding was carried out using a shaping material obtained in an example or a comparative example to produce a dumbbell-shaped test piece. A tensile test was performed according to JIS K7161 using the obtained test piece, and the elastic modulus and the breaking strain were measured. For each test piece, the test was conducted 5 times, and the average value is presented in Table 1.

Production Example 1

In a polymerization reactor in which drying and nitrogen substitution were performed, 7 parts (1% with respect to the total amount of monomers used for polymerization) of a monomer mixture consisting of 40% by mass of methano-tetrahydrofluorene (hereinafter abbreviated as "MTF"), 35% by mass of tetracyclododecene (hereinafter abbreviated as "TCD"), and 25% by mass of dicyclopentadiene (hereinafter abbreviated as "DCP"), 1,600 parts of dehydrated cyclohexane, 0.55 parts of 1-hexene as a molecular weight modifier, 1.3 parts of diisopropyl ether, 0.33 parts of isobutyl alcohol, 0.84 part of triisobutylaluminum, and 30 parts of 0.66% by mass of tungsten hexachloride in a cyclohexane solution were charged and stirred at 55° C. for 10 minutes.

Then, 693 parts of the monomer mixture and 72 parts of a 0.77% by mass of tungsten hexachloride in a cyclohexane solution were continuously added dropwise to the polymerization reactor over 150 minutes respectively while maintaining the reaction system at 55° C. and stirring. After further stirring for 30 minutes following completion of dropwise addition, 1.0 part of isopropyl alcohol was added to stop the polymerization reaction. The polymerization reaction solution was measured by gas chromatography, and the conversion ratio of the monomers to the polymer was 99.9%.

Then, 300 parts of the polymerization reaction solution containing the polymer set forth above was transferred to an autoclave equipped with a stirrer, to which 100 parts of cyclohexane and 2.0 parts of a diatomite-supported nickel catalyst (JGC CORPORATION; "T8400RL", nickel-supported ratio: 58%) were added. After hydrogen substitution in the autoclave, they were allowed to react for 6 hours under a hydrogen pressure of 4.5 MPa at 180° C.

After completion of the hydrogenation reaction, a pressure filtration treatment was carried out using a pressure filter (Ishikawajima-harima Heavy Industries; "Funda filter") with diatomite ("Radiolite® (Radiolite is a registered trademark in Japan, other countries, or both) #500") as a filter bed at a pressure of 0.25 MPa to give a clear colorless solution.

Then, as an antioxidant, 0.5 part of pentaerythrityl-tetrakis[3-(3,5-di-t-butyl-4-hydroxyphenyl)propionate] (Ciba Specialty Chemicals Inc.; "Irganox® (Irganox is a registered trademark in Japan, other countries, or both) 1010") per 100 parts of the above-mentioned hydrogenated product was added to and dissolved in the resulting solution.

Subsequently, the solvent cyclohexane and other volatile components were removed from the filtrate obtained above using a cylindrical concentrating and drying machine (Hitachi Ltd.) at a temperature of 260° C. and a pressure of 1 kPa or less, and the resultant in a molten state was extruded in the form of a strand from a die directly connected to the concentrator. After water cooling, the strand was cut with a pelletizer (OSADA SEISAKUSHO; "OSP-2") to obtain a cyclic olefin polymer pellet.

The weight-average molecular weight of this cyclic olefin polymer hydride was 29,500, the molecular weight distribution was 2.22, the percent hydrogenation was 99.9%, and the glass-transition temperature was 141° C.

Example 1

Using the pellet obtained in Production Example 1 as a raw-material resin, a purification treatment was performed under conditions described in Table 1 with a completely meshed co-rotating twin-screw extruder having a structure illustrated in FIG. 2A (BTN-42, screw diameter: 42 mm, L/D: 45, Research Laboratory of Plastics Technology Co., Ltd.). Then, the discharged strand was rapidly cooled in a water bath and cut to obtain a pellet (shaping material).

The temperatures of the cylinder units were as follows: C1: 120° C., C2: 200° C., C3 to C7: 260° C.

The measurement results of the obtained shaping material are presented in Table 1.

Examples 2 to 5, Comparative Examples 1 to 3

Shaping materials were produced in the same manner as in Example 1 except that injection molding was performed under conditions described in Table 1.

The measurement results of the obtained shaping materials are presented in Table 1.

Comparative Example 4

Using the raw-material resin in Example 1 (the pellet obtained in Production Example 1) as a sample, quantification of the amount of volatile components and mechanical strength measurement were performed. The results are presented in Table 1.

Example 6

Using the pellet obtained in Production Example 1 as a raw-material resin, a purification treatment was performed under conditions described in Table 2 with a injection molding machine having a structure illustrated in FIG. 2B (SXBTN-42, screw diameter: 42 mm, L/D: 48, Research Laboratory of Plastics Technology Co., Ltd.). Then, the discharged strand was rapidly cooled in a water bath and cut to obtain a pellet (shaping material).

The temperatures of the cylinder units were as follows: C1: 50° C., C2: 240° C., C3 to C12: 260° C.

The measurement results of the obtained shaping material are presented in Table 2.

Example 7, Comparative Examples 5 and 6

Shaping materials were produced in the same manner as in Example 6 except that injection molding was performed under conditions described in Table 2.

The measurement results of the obtained shaping materials are presented in Table 2.

TABLE 1

|  |  |  | Examples |  |  |  |  | Comparative Examples |  |  |  |
|---|---|---|---|---|---|---|---|---|---|---|---|
|  |  |  | 1 | 2 | 3 | 4 | 5 | 1 | 2 | 3 | 4 |
| Raw-material resin supply rate (kg/h) |  |  | 25 | 25 | 25 | 25 | 25 | 25 | 25 | 25 | — |
| Rotation number of screw (rpm) |  |  | 313 | 313 | 313 | 313 | 313 | 104 | 313 | 313 | — |
| Fluid for purification | Fluid injection port (11) | Type | $H_2O$ | $H_2O$ | $H_2O$ | $H_2O$ | — | $H_2O$ | — | — | — |
|  |  | Injected amount per 100 parts of raw-material resin (parts) | 2 | 1 | 2 | 2 | 0 | 2 | 0 | 0 | — |
|  | Fluid injection port (12) | Type | $H_2O$ | $H_2O$ | $H_2O$ | $H_2O$ | $H_2O$ | $H_2O$ | — | — | — |
|  |  | Injected amount per 100 parts of raw-material resin (parts) | 2 | 2 | 1 | 2 | 3 | 2 | 0 | 0 | — |
| Pressure at fluid discharge port | Fluid discharge port (13) (kPa) |  | 1.0 | 1.0 | 1.0 | 1.0 | 1.0 | 1.0 | 1.0 | 1.0 | — |
|  | Fluid discharge port (14) (kPa) |  | 1.0 | 1.0 | 1.0 | 1.0 | 1.0 | 1.0 | 1.0 | 1.0 | — |
| Oxygen concentration of gas phase within cylinder (% by volume) |  |  | 2 | 2 | 2 | 4 | 2 | 2 | 2 | 7 | — |
| Amount of volatile components | Outgas A (ppm) |  | 0.1 | 0.1 | 0.2 | 0.2 | 0.2 | 8.5 | 0.2 | 0.2 | 8.7 |
|  | Outgas B (ppm) |  | 1.1 | 1.4 | 1.7 | 1.2 | 2.4 | 9.2 | 8.1 | 8.1 | 9.3 |
| Mechanical strength measurement | Elastic modulus (MPa) |  | 2183 | 2207 | 2167 | 2181 | 2189 | 2172 | 2139 | 2119 | 2178 |
|  | Breaking strain (%) |  | 18.3 | 18.5 | 18.4 | 18.1 | 18.2 | 18.4 | 18.5 | 9.2 | 18.6 |

TABLE 2

|  |  |  | Examples |  | Comparative Examples |  |
|---|---|---|---|---|---|---|
|  |  |  | 6 | 7 | 5 | 6 |
| Raw-material resin supply rate (kg/h) |  |  | 40 | 40 | 40 | 40 |
| Rotation number of screw (rpm) |  |  | 160 | 160 | 80 | 160 |
| Fluid for purification | Fluid injection port (18) | Type | $CO_2$ | $CO_2$ | $CO_2$ | — |
|  |  | Injected amount per 100 parts of raw-material resin (parts) | 3 | 1 | 3 | 0 |
| Pressure at fluid discharge port | Fluid discharge port (19) (kPa) |  | 1.0 | 1.0 | 1.0 | 1.0 |
|  | Fluid discharge port (20) (kPa) |  | 1.0 | 1.0 | 1.0 | 1.0 |
| Oxygen concentration of gas phase within cylinder (% by volume) |  |  | 2 | 2 | 2 | 2 |
| Pressure of gas phase within cylinder (MPa (G)) |  |  | 6.7 | 6.1 | 10.4 | 5.2 |
| Amount of volatile components | Outgas A (ppm) |  | 0.1 | 0.1 | 0.1 | 1.1 |
|  | Outgas B (ppm) |  | 2.3 | 2.2 | 5.5 | 8.9 |
| Mechanical strength measurement | Elastic modulus (MPa) |  | 2146 | 2111 | 2122 | 2072 |
|  | Breaking strain (%) |  | 18.1 | 18.1 | 18.7 | 18.3 |

The following can be found from Tables 1 and 2.

The shaping materials obtained in Examples 1 to 7 had a very small amount of outgas. Furthermore, the shaped resin products obtained from these shaping materials had a sufficient mechanical strength.

Particularly, comparing Examples 2 and 5, it is found that the amount of volatile components can be more reduced in the case of divided injection of water from two places than in the case of injection of water from one place when the same amount of water is used in each case.

On the other hand, in Comparative Examples 1 and 5, the amounts of outgas in the obtained shaping materials were large because the rotation numbers of the screw were low.

In Comparative Examples 2, 3, and 6, the amounts of outgas in the obtained shaping materials were large because fluid for purification was not injected or the amount thereof was insufficient.

Particularly, in Comparative Example 3, since the oxygen concentration in the gas phase within the cylinder was high, the shaped resin product obtained using the shaping material was inferior in mechanical strength.

REFERENCE SIGNS LIST

1. Extruder
2. Cylinder
3. Screw
4. Resin introduction port
5. Resin discharge port
6. Fluid injection port
7. Fluid discharge port
8. Extruder
9. Resin introduction port
10. Resin discharge port
11, 12 Fluid injection port
13, 14 Fluid discharge port
15. Extruder
16. Resin introduction port
17. Resin discharge port
18. Fluid injection port
19, 20 Fluid discharge port
21. Pressure gauge

The invention claimed is:

1. A method for producing a shaping material by passing a raw-material resin that contains a cyclic olefin polymer in a molten state through an extruder, the extruder being equipped with a cylinder, a screw housed within the cylinder, a resin introduction port for introducing the raw-material resin into the cylinder, a resin discharge port for discharging the molten resin from the cylinder, a fluid injection port for injecting carbon dioxide or water into the cylinder between the resin introduction port and the resin discharge port, and a fluid discharge port for removing fluid in the cylinder by suction downstream of the fluid injection port and between the resin introduction port and the resin discharge port;

the method comprising:

injecting 1 to 6 parts by mass of carbon dioxide or water per 100 parts by mass of the raw-material resin into the cylinder from the fluid injection port while transporting the molten raw-material resin within the cylinder to bring carbon dioxide or water into contact with the molten raw-material resin, and discharging fluid in the cylinder from the fluid discharge port, thereby removing a volatile compound in the raw-material resin; and cooling and solidifying the molten resin discharged from the resin discharge port, wherein the rotation number of the screw during extrusion of the molten raw-material resin is 150 rpm or higher, and the oxygen concentration of the gas phase within the cylinder when the molten resin is brought into contact with carbon dioxide or water while being transported within the cylinder is 5% by volume or less.

2. The method for producing a shaping material according to claim 1, wherein a content ratio of a compound that has a boiling point of lower than 200° C. with respect to the whole raw-material resin is 15 to 50 ppm in terms of n-decane when components of the raw-material resin are analyzed by the following dynamic headspace-gas chromatography/mass spectrometry:

a sample container composed of a glass tube having an inner diameter of 4 mm, in which 100 mg of the raw-material resin is charged, is connected to a gas collection tube that have been cooled by liquid nitrogen, and then the sample container is heated at 200° C. for 30 minutes in a high-purity helium stream, followed by continuously collecting gas released from the raw-material resin into the gas collection tube; and the collected gas is subjected to thermal desorption-gas chromatography-mass spectrometry using n-decane as an internal standard, and the amount of the gas released from the raw-material resin is calculated in terms of n-decane.

3. The method for producing a shaping material according to claim 1, wherein the extruder is a twin-screw extruder.

4. The method for producing a shaping material according to claim 1, wherein the temperature of the molten raw-material resin in the cylinder is 290° C. to 330° C.

5. The method for producing a shaping material according to claim 1, wherein the pressure at the fluid discharge port is 500 to 3,000 Pa.

6. The method for producing a shaping material according to claim 1, wherein the content ratio of a compound that has a boiling point of lower than 200° C. with respect to the whole shaping material is 3 ppm or less in terms of n-decane when components of the shaping material are analyzed by the following dynamic headspace-gas chromatography/mass spectrometry:

a sample container composed of a glass tube having an inner diameter of 4 mm, in which 100 mg of the shaping material is charged, is connected to a gas collection tube that have been cooled by liquid nitrogen, and then the sample container is heated at 200° C. for 30 minutes in a high-purity helium stream, followed by continuously collecting gas released from the shaping material into the gas collection tube; and the collected gas is subjected to thermal desorption-gas chromatography-mass spectrometry using n-decane as an internal standard, and the amount of the gas released from the shaping material is calculated in terms of n-decane.

* * * * *